Jan. 26, 1932.  F. D. WILSON  1,843,009
CLEANING MECHANISM FOR MATERIAL ELEVATORS
Filed Nov. 7, 1927
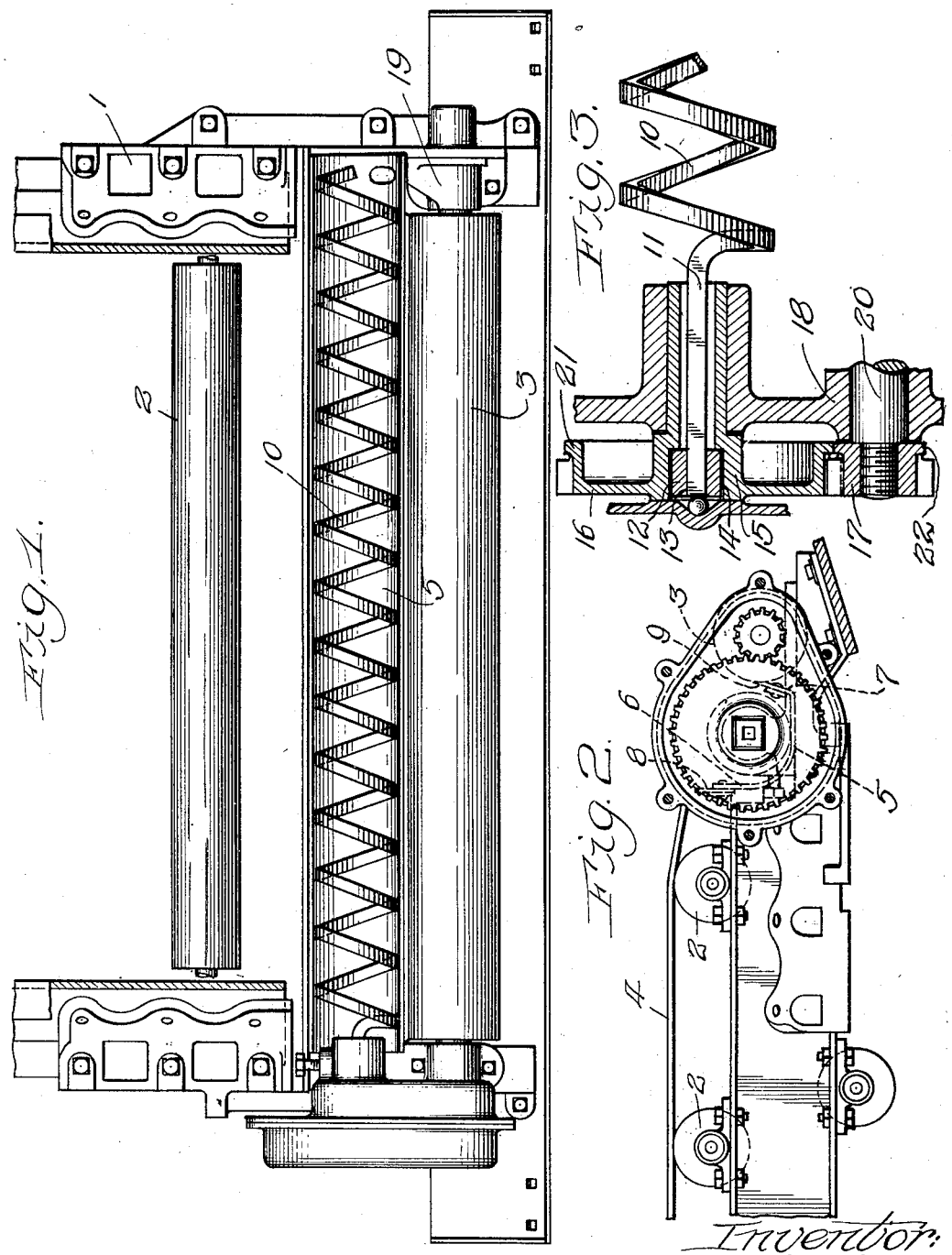
Inventor:
Fred D. Wilson,
By Wallace R. Lane
Atty.

Patented Jan. 26, 1932

1,843,009

UNITED STATES PATENT OFFICE

FRED D. WILSON, OF HARVEY, ILLINOIS, ASSIGNOR TO AUSTIN MANUFACTURING CO., OF CHICAGO, ILLINOIS, A CORPORATION OF ILLINOIS

CLEANING MECHANISM FOR MATERIAL ELEVATORS

Application filed November 7, 1927. Serial No. 231,693.

This invention relates to cleaning mechanisms, and more particularly to the provision of a cleaning mechanism for cleaning and discharging material that has accumulated around the idler roller of an elevating grader.

Among the objects of my invention are to provide a cleaning mechanism that is capable of positively removing accumulated dirt or other material from the idler roller, carrying the same along the surface of a pan or other receptacle, and discharging the same over the side of the elevating mechanism; further to provide a new and improved construction of pan for receiving the accumulated dirt or other material after the same has been scraped from the idler roller; further to provide a new and improved type of spiral for carrying the accumulated material to the discharge edge of the pan or other receptacle; further to provide a new and improved construction of means for driving the spiral; further to provide a new and improved construction of gears for driving the spiral; further to provide means for preventing damage to the gears because of the tendency of the enormous tension on the conveyor belt of pulling the gears further into mesh and thereby damaging the same; further to provide a cleaning mechanism of maximum simplicity, efficiency, economy, and ease of operation; and such further objects, advantages and capabilities as will later more fully appear.

My invention further resides in the combination, construction and arrangement of parts illustrated in the accompanying drawings, and while I have shown therein a preferred embodiment, I desire it to be understood that the same is susceptible of modification and change, without departing from the spirit of my invention.

In the drawings:

Figure 1 is a plan view of an elevating grader with the belt removed.

Figure 2 is a fragmentary view in side elevation showing in detail the means of driving the spiral for removing the accumulated dirt or other material from the idler roller.

Figure 3 is a fragmentary view in cross section showing the means of attaching and driving the spiral.

Referring to the drawings, the material elevator is designated generally at 1. This elevator comprises a series of rollers 2, an idler 3, and a belt 4, for transporting the material. My cleaning mechanism is located directly behind the idler roller and comprises a pan 5 having upstanding portions 6 and 7. The pan is held in place by any suitable means such as rivets, bolts, or the like which are attached to a cross-bar 8 made rigid with the frame of the material elevator. The side of the pan next to the idler roller is provided with a scraper 9 for scraping the dirt or other material from the idler roller and for allowing the same to fall within the confines of the pan. This scraper is attached to the side of the pan by any suitable means and bears directly against the idler roller, it being understood that the roller is rotating in a counter clock-wise direction.

A spiral 10 is mounted for rotation in the pan and is of sufficient diameter to barely touch the lower side of the belt. This spiral is mounted at but one end, the other end being free, this mounting permitting the spiral to assume any favorable position in the pan in so far as the pan sides permit. The spiral is thus adapted to roll back and forth while revolving and will thus keep clean a larger pan than otherwise would be the case were the spiral mounted at both ends. The spiral is not an auger in the accepted sense of the word for the reason that it is without a center, and it is this feature coupled with the fact that the material is naturally flexible that prevents material from adhering to the spiral. This construction of spiral is very important, for with the same provided with a center, the material would adhere thereto and within a short time the cleaning mechanism would be useless. As shown in Figure 3, the spiral is made of square spring steel, although this may be made of other material. The spiral is provided at its forward end with a straight horizontal section 11. A driving block 12, provided with a square hole 13 receives the forward end of the horizontal section 11. The spiral thus forms a square shaft. The driving block 12 is loosely fitted in and driven by a square hole 14 in the hub 15 of the driven gear 16. The loose fitting of the driving block 12 permits a limited amount of self-alinement. A pinion 17 is threaded on the front gudgeon of the idler roller 3, this roller being actuated by the conveyor belt.

Because of the enormous tension on the conveyor belt, and in order that wear on the boxing 18 and 19 on the shaft 20 of the idler roller may not result in damaged gears by pulling the pinion into the gear, each of the gears is provided with a disc cast integral therewith, the gear 16 being provided with a disc 21, while the pinion 17 is provided with a disc 22. The diameter of each of the discs is equal to the pitch diameter of the gears, and thus will prevent any damage to the gears caused by any excess tension on the conveyor belt. The pinion cannot be pulled into the gear beyond the pitch diameter. Although I have shown and described the discs as being cast integral with the pinion and gear, they may be cast separately and rigidly attached thereto by any suitable means such as bolts or the like.

While I have referred more particularly to the cleaning mechanisms for material elevators, I wish it to be understood that my invention is readily adapted for use with other conveying systems. One of the troublesome features of machines for conveying and elevating materials such as dirt or the like in which a belt is used as a conveying medium, is that the dirt or other material collects between the upper and lower belt and becomes packed around the idler roller, thus increasing its diameter, and straining or tearing the belt, or causing the belt to slip. This increases the machine draft and it entails the loss of time necessary to clean the excess material away, and further results in a loss of power. My invention eliminates such waste of time and expense.

Having thus described my invention, I claim:

1. In a cleaning mechanism for material elevators having an idler roller provided with a shaft, a pinion on said shaft, a gear driven by said pinion, a pan adjacent said roller, a spiral mounted in said pan and driven by said gear, and means mounted on said pinion and gear and having a diameter equal to their pitch diameters for preventing said pinion and gear from jamming.

2. In a material elevator having an endless conveyor passing over an idler, and rotatable cleaning means touching the inner surface of said conveyor for removing foreign material therefrom, and means operatively connected to said cleaning means and said idler for operating said cleaning means.

3. In a cleaning mechanism for material elevators provided with a belt, a pan, and a spiral revolubly mounted in said pan and fitting comformably therein and touching the under side of said belt for discharging material that has accumulated in said pan.

4. In a cleaning mechanism, a pan, a spiral for discarding material accumulated in said pan, and means for mounting and revolving said spiral, said means comprising a driven gear, a rectangular opening in the hub of said gear, a rectangular block loosely mounted in said opening for permitting a limited amount of self alinement, an opening in said block, and a horizontal portion on said spiral mounted in the opening in said block and providing a shaft for said spiral.

5. In a cleaning mechanism, a pan, a spiral for discarding the material accumulated in said pan, and means for mounting and revolving said spiral, said means comprising a driven gear, an opening in the hub of said gear, a block loosely mounted in said opening for permitting a limited amount of self alinement, an opening in said block, and a horizontal portion on said spiral mounted in the opening in said block and providing a shaft for said spiral.

6. In a cleaning mechanism for material elevators provided with a belt and an idler rolled, comprising a pan, a scraper mounted on said pan and contacting with said roller, a spiral mounted at one end only for rotation in said pan, said spiral being located adjacent the pan and touching the under side of said belt to clean it of foreign material and for discharging accumulated material from the end of said pan.

7. In a cleaning mechanism for material elevators provided with a belt and an idler roller, a pan, a scraper mounted on said pan and contacting with said roller, a spiral mounted conformably in said pan, said spiral being located adjacent said pan and touching the under side of said belt to clean it of foreign material and for discharging accumulated material from said pan.

8. In a cleaning mechanism for material elevators having a belt, a pan for collecting material adhering to said belt, a spiral in said pan for touching said belt to clean it of adhering material and mounted at one end only for rotation therein, the other end of said spiral being free for lateral movement in said pan.

9. In a cleaning mechanism for material elevators having a belt, a pan for collecting material adhering to said belt, a spiral in said pan for touching said belt to clean it of adhering material and mounted at one end only for rotation therein, said spiral having a diameter so as to provide substantial clearance spaces therebetween and said pan, the other end of said spiral being free for movement in said spaces.

In witness whereof, I hereunto subscribe my name to this specification.

FRED D. WILSON.